No. 898,029. PATENTED SEPT. 8, 1908.
W. R. BARBOUR.
METALLIC TIRE.
APPLICATION FILED APR. 16, 1907.
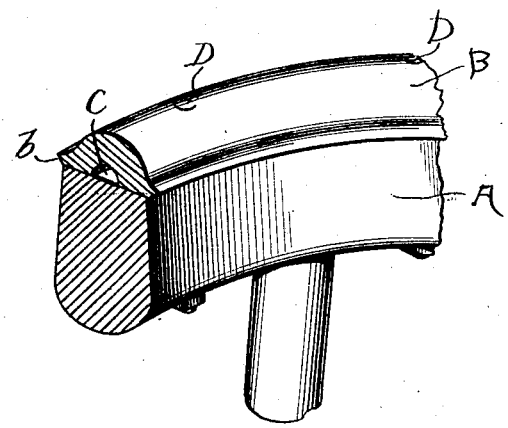
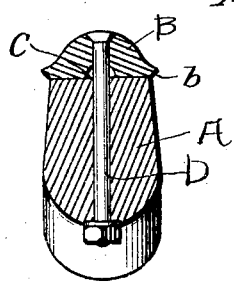
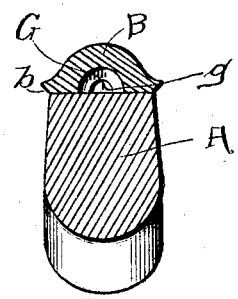
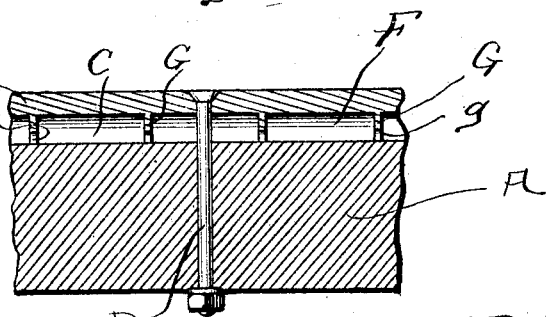
Witnesses
P. Wooldridge,
L. E. Barkley.
Inventor
Wolsey R. Barbour,
By Frank A. Appleman,
Attorney.

UNITED STATES PATENT OFFICE.

WOLSEY R. BARBOUR, OF TERRE HAUTE, INDIANA.

METALLIC TIRE.

No. 898,029.  Specification of Letters Patent.  Patented Sept. 8, 1908.

Application filed April 16, 1907. Serial No. 368,472.

*To all whom it may concern:*

Be it known that I, WOLSEY R. BARBOUR, citizen of the United States of America, and resident of Terre Haute, in the county of Vigo and State of Indiana, have invented certain new and useful Improvements in Metallic Tires, of which the following is a specification.

This invention relates to vehicles and particularly to tires for vehicle wheels.

An object of this invention is to provide novel means for permitting access of air between the rim of the wheel and the tire whereby through the medium of circulation of air, undue heating of the rim is prevented. It has been found in practice that as the rim becomes dry, shrinkage results and the tire becomes loose and the rim becomes brittle and is easily fractured.

By the use of my invention I provide, as stated, the free circulation of air around the rim or felly, thus obviating drying out of the felly or rim. By the use of my invention I also provide means for permitting the application of a preservative to the felly or rim, and such preservative may take the form of linseed oil or other liquid which will flow in a channel around the felly, permitting the said felly to absorb the liquid to maintain the felly in its elastic state and prevent drying of the same; or to prevent the saturation of the felly with water, which may find its way between the tire and felly. This is especially effective in preventing the felly from shrinking in dry weather and the expansion thereof in wet weather, when in ordinary tires moisture finds its way between the tire and felly.

A still further object of this invention is to provide means for increasing the strength of a tire which is hollowed out in its undersurface to lighten the tire, by this means I may attain a maximum rigidity and strength with a minimum weight and mass of material, but at the same time accomplish the result of permitting the circulation of air or liquid between the tire and felly.

A still further object of this invention is to provide novel means for permitting the application of liquid to the channel between the felly and tire.

A further object of this invention is to provide a tire which will have a tendency to deflect stones from its path of travel when contacting with said stones, the said tire also preventing skidding or sidewise sliding of the wheels.

A further object of the invention is to provide a tire which does not have a direct bearing on the ends of the spokes, projecting through the felly and by reason of the construction of the tire, splitting of the felly is prevented for the reason that the bearing surface of the tire on the felly is equalized and a knock or contact of any object on the tire is equally distributed on both sides of the tire where it contacts with the felly. A vehicle equipped with these tires will be lighter in draft and will ride easier and make less noise than the ordinary flat tires and, owing to the elasticity of the tire, the life of the wheel will be increased.

By reason of novel reinforcing devices on the interior of the tire, I am able to use less material for a given strength than is possible with any other form of tire and by reason of these reinforcing devices, splitting or breaking down of the tire is prevented.

A further object of this invention is to provide novel means to protect the sides of the felly so that the paint will not be marred and furthermore the arrangement of the tire with relation to the felly protects the felly from the action of the sun and water. Owing to a novel construction of the edges of the tire, the wheel will more readily crawl out of ruts or car tracks, as the sharpened edges of the tire will engage the said track or the sides of the ruts and ride therefrom.

A still further object of this invention is to provide a tire of the character noted which will be simple in construction, efficient in practice and inexpensive to manufacture.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1, is a perspective view of a tire applied to a felly. Fig. 2, is a sectional view thereof through the bolt hole. Fig. 3, is a modification thereof. Fig. 4, is a longitudinal sectional view of the modification. Figs. 5 and 6 are further modifications.

In these drawings A, denotes the felly which may be of any ordinary construction for any weight vehicle and B, is the tire embodied in the invention.

The contour of the outer surface of the tire may be elliptical or nearly half round, although I prefer that the surface of the tire from the edge to the center thereof will describe a compound curve, as shown in the drawings. The edge of the tire is beveled, as at b, and the junction of the beveled portion with the upper surface thereof produces a sharp edge which is designed to engage a rail or the sides of a rut to permit the wheel to climb from the rail or rut in travel.

The sectional view of the drawing shows that the central portion of the tire is increased in thickness as compared with the tire near the edge thereof, and by reason of this thickened portion, the outer surface of the tire is curved transversely so that the tread of the tire under ordinary conditions is very limited; in fact, on hard roadbeds the contacting surface of the tire is very small, but the surface is increased as the tire is permitted to sink into the roadbed. When hard roadbeds, cobble stones or other unyielding surfaces are encountered, the contacting surfaces are so small as to minimize the draft of the vehicle.

In order to lighten the tire and for the further purpose of permitting circulation of air between the tire and the felly, and for the still further purpose of permitting the flow of liquid between the tire and the felly, I have provided an annular recess C, in the undersurface of the tire which, when the tire is in contact with the felly, forms a channel through which air or liquid may circulate to accomplish the result heretofore stated. That is to say, the circulation of air prevents heating of the felly and the consequent drying out of the said felly, or the channel thus formed permits oil or other preservative to be applied to the outer surface of the felly without removing the tire.

As is shown in the drawings, the tire is secured in place by a series of bolts D, extending through the tire and felly and when it is desired to apply oil or other preservative to the channel, one of the bolts is removed and by plugging the lower end of the hole through the felly, oil may be applied from the top and permitted to flow, as stated, between the tire and felly.

Another great advantage of this construction is, that owing to the fact that pressure is removed from the ends of the spokes which may project through the felly, the ends of said spokes are not marred or battered and their durability is not curtailed. If desired there may be a slight bevel E, at the junction of the recessed portion and the undersurface of the tire to further obviate a contact of the tire with the spokes. As will be seen from an inspection of the drawing, if the tire strikes an obstruction, the action of the blow on the felly is equalized and distributed to such an extent as to prevent splitting or splintering of one side.

In order to permit the utilization of a minimum amount of metal in the manufacture of a tire without materially reducing the strength thereof, I have adopted the construction embodied in the modification wherein the recess F, is larger in proportion than the channel in the form shown in Fig. 1, and the thickness of the tire is practically uniform. In order to reinforce the tire to prevent bending or fracture when contacting with obstructions, I provide a series of transversely disposed ribs G, equidistantly spaced throughout the length of the tire and tending to strengthen the said tire as stated. In order, however, not to interfere with the free circulation of the air or the free flow of the liquid between the felly and tire, I slightly recess each of the ribs as shown at g, so that when the tire is in place, the channel formed between the tire and felly would be to all practical purposes, the same as that heretofore disclosed, and it is designed to accomplish the same result.

Tires made in accordance with this disclosure will readily ride over ice covered roadbeds without skidding as the contacting surface of the tire is such as to cause it to be slightly embedded in the ice and this prevents the sidewise sliding action. A tire made in accordance with this invention will also readily displace loose stones with which it comes in contact so that instead of riding over the said stones, the tendency is to displace the stones and remove them from the path of travel of the vehicle.

What I claim is:

1. In a vehicle wheel, a suitable tire, said tire having recesses in its inner surface interrupted by a series of transverse ribs, the said ribs having recesses.

2. In a vehicle wheel, a felly, a tire secured thereto, said tire being approximately semi-elliptical in cross section and having an annular groove adapted when applied to the felly to form a channel, said channel being interrupted by a series of transverse ribs, said ribs having recesses, said tire extending beyond either side of the felly, the portions of the tire beyond the felly being beveled.

3. In a vehicle wheel, a felly, a tire secured thereto, said tire being approximately semi-elliptical in cross section and having an annular groove adapted when applied to the felly to form a channel, said channel being interrupted by a series of transverse ribs, said tire extending beyond either side of the felly, the portions of the tire beyond the felly being beveled toward the felly.

4. A tire having a flat surface adapted to contact with a felly, a convexed tread surface merging with concavities near the edges of the tire, the said tire being of greater width than the felly, the portions beyond the felly having their under surfaces beveled from the felly and merging with the outer or tread surface of the tire at acute angles.

5. A new article of manufacture consisting of a vehicle tire, the edges of the tire being adapted to extend beyond the sides of a felly when the tire is attached thereto, the outer surface of the tire having a convex center and concaved on the sides of the center toward the edges, the surface of the said felly toward each edge extending away from the inner surface of the tire, each edge of the tire being beveled from its inner surface to a point of intersection with the outer surface of the tire.

6. A metallic vehicle tire having a flat inner surface adapted to lie on the felly, the edges of the tire being extended beyond the sides of the felly when the tire is attached thereto, the outer surface of the tire having a convexed tread surface with an annular concavity on each side of the convexed tread surface, the portions of the tire extending beyond the felly having the under surfaces beveled toward and merging with those portions of the tire having the concavities, whereby the upper and lower walls of the tire merge on an acute angle.

In testimony whereof I affix my signature in the presence of two witnesses this 8th day of April, 1907.

WOLSEY R. BARBOUR.

Witnesses:
   Thomas J. Kelly,
   Albert J. Kelley.